US006493691B1

(12) United States Patent
Neuneier et al.

(10) Patent No.: US 6,493,691 B1
(45) Date of Patent: Dec. 10, 2002

(54) ASSEMBLY OF INTERCONNECTED COMPUTING ELEMENTS, METHOD FOR COMPUTER-ASSISTED DETERMINATION OF A DYNAMICS WHICH IS THE BASE OF A DYNAMIC PROCESS, AND METHOD FOR COMPUTER-ASSISTED TRAINING OF AN ASSEMBLY OF INTERCONNECTED ELEMENTS

(75) Inventors: Ralf Neuneier, München (DE); Hans-Georg Zimmermann, Starnberg/Percha (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/529,195

(22) PCT Filed: Jul. 1, 1999

(86) PCT No.: PCT/DE99/02014

§ 371 (c)(1),
(2), (4) Date: Apr. 7, 2000

(87) PCT Pub. No.: WO00/08599

PCT Pub. Date: Feb. 17, 2000

(30) Foreign Application Priority Data

Aug. 7, 1998 (DE) .......................................... 198 35 923

(51) Int. Cl.$^7$ ................................................ G06N 3/02
(52) U.S. Cl. ............................ 706/45; 706/23; 187/247
(58) Field of Search ..................... 706/45, 23; 187/247; 700/51

(56) References Cited

U.S. PATENT DOCUMENTS

| | | | | |
|---|---|---|---|---|
| 5,142,612 A | * | 8/1992 | Skeirik et al. | ................. 706/23 |
| 5,282,261 A | * | 1/1994 | Skeirik | ......................... 706/23 |
| 5,354,957 A | * | 10/1994 | Robertson | ................... 187/247 |
| 5,444,819 A | | 8/1995 | Negishi | |
| 5,668,717 A | * | 9/1997 | Spall | ............................ 700/51 |
| 5,761,386 A | | 6/1998 | Lawrence et al. | |

OTHER PUBLICATIONS

;Lubensky, D., "Learning Spectral–Temperal Dependencies Using Connectionist Networks", IEEE, (1988) pp. 418–421.
Templeman, James N., Race Networks a Theory of competitive Recognition Networks Based on the Rate of Reactivation of Neurons in Cortical Columns, International Conf. on Neural Networks, (1988), pp. 11–9 thru 11–16.
Takase, et al. "Time Sequential Pattern transfomration and Attractors of recurrent Neural Networks", International Joint Conf. on Neural Networks, (1993), pp. 2319–2322.
Haykin, Simon, Neural Networks: A comprehensive Foundation, Macmillan College Publishing Company, (1994) pp. 498–533.
Ackley, D. et al., "A Learning Algorithm for Boltzmann Machines", Cognitive Science, (1985) pp. 147–169.
Rehkugler, H. et al., Neuronale Netze in Der Oekonomie, Grundlagen und Finanzwirtschaftliche Anwendungen, (1994), pp. 3–90.

* cited by examiner

Primary Examiner—Wilbert L. Starks, Jr.

(57) ABSTRACT

An input signal is transformed into a predetermined space. Transformation computer elements are connected to one another such that transformed signals can be taken at the transformation computer elements, whereby at least three transformed signals relate to respectively successive points in time. Composite computer elements are respectively connected to two transformation computer elements. Further, a first output computer element is provided at which an output signal that describes a system status at a point in time can be taken. The first output computer element is connected to the transformation computer elements. Further, a second output computer element is provided that is connected to the composite computer elements and given whose employment a predetermined condition can be taken into consideration when training the arrangement.

26 Claims, 9 Drawing Sheets

Microfiche Appendix Included
(1 Microfiche, 69 Pages)

ASSEMBLY OF INTERCONNECTED COMPUTING ELEMENTS, METHOD FOR COMPUTER-ASSISTED DETERMINATION OF A DYNAMICS WHICH IS THE BASE OF A DYNAMIC PROCESS, AND METHOD FOR COMPUTER-ASSISTED TRAINING OF AN ASSEMBLY OF INTERCONNECTED ELEMENTS

This application contains a microfiche appendix submitted on 1 microfiche sheet and 69 frames.

BACKGROUND OF THE INVENTION

1. Field of the Invention

The invention is directed to an arrangement of computer elements connected to one another, methods for computer-supported determination of a dynamics that forms the basis of a dynamic process, and is also directed to a method for computer-supported training of an arrangement of computer elements connected to one another.

2. Description of the Related Art

The publication by S. Haykin, Neural Networks: A Comprehensive Foundation, discloses that an arrangement of computer elements connected to one another be utilized for determining a dynamics that forms the basis of a dynamic process.

In general, a dynamic process is usually described by a status transition description that is not visible to an observer of the dynamic process and by an output equation that describes observable quantities of the technical, dynamic process.

Figure 2:
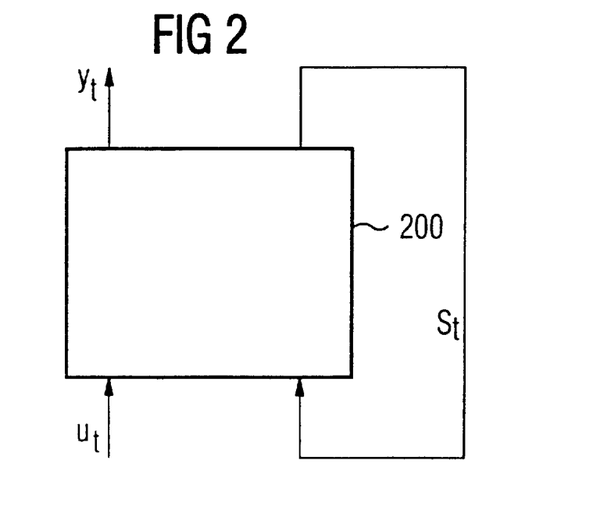
FIG. 2 is a block diagram of a general structure of a dynamic system.

Such a structure is shown in FIG. 2.

A dynamic system 200 is subject to the influence of an external input quantity u of a prescribable dimension, whereby an input quantity $u_t$ at a time t is referenced $u_t$:

$$u_t \in \Re^1,$$

whereby 1 references a natural number.

The input quantity $u_t$ at a time t causes a change of the dynamic process that sequences in the dynamic system 200.

An internal condition $s_t$ ($s_t \in \Re^M$) of a prescribable dimension m at a time t cannot be observed by an observer of the dynamic system 200.

Dependent on the internal condition $s_t$ and on the input quantity $u_t$, a status transition of the internal condition $s_t$ of the dynamic process is caused, and the status of the dynamic process switches into a successor status $s_{t+1}$ at a following point in time t+1.

The following is thereby valid:

$$s_{t+1} = f(s_t, u_t) \qquad (1)$$

whereby f(.) references a general imaging rule.

An output quantity $y_t$ at a point in time t observable by a observer of the dynamic system 200 is dependent on the input quantity $u_t$ as well as on the internal status $s_t$.

The output quantity $y_t$ ($y_t \in \Re^n$) is a prescribable dimension n.

The dependency of the output quantity $y_t$ on the input quantity $u_t$ and on the internal status $s_t$ of the dynamic process is established by the following, general rule:

$$y_t = g(s_t, u_t), \qquad (2)$$

whereby g(.) references a general imaging rule.

For describing the dynamic system 200, the Haykin publication utilizes an arrangement of computer elements connected to one another in the form of a neural network of neurons connected to one another. The connections between the neurons of the neural network are weighted. The weightings of the neural network are combined in a parameter vector v.

An inner status of a dynamic system that underlies a dynamic process is thus dependent—according to the following rule—on the input quantity $u_t$ and on the internal status of the preceding point in time $s_t$ and on the parameter vector v:

$$s_{t+1} = NN(v, s_t, u_t), \qquad (3)$$

whereby NN(.) references an imaging rule prescribed by the neural network.

The arrangement known from Haykin and referred to as Time Delay Recurrent Neural Network (TDRNN) is trained such in a training phase that a respective target quantity $y_t^d$ at a real dynamic system is respectively determined for an input quantity $u_t$. The Tupel (input quantity, identified target quantity) is referred to as training datum. A plurality of such training data form a training data set.

The TDRNN is training with the training data set. An overview of various training methods can likewise be found in Haykin.

It must be emphasized at this point that only the output quantity $y_t$ at a time t of the dynamic system 200 can be recognized. The internal system status $s_t$ cannot be observed.

The following cost function E is usually minimized in the training phase:

$$E = \frac{1}{T}\sum_{t=1}^{T}(y_t - y_t^d)^2 \longrightarrow \min_{f,g} \qquad (4)$$

whereby T references a plurality of points in time taken into consideration.

Figure 3:
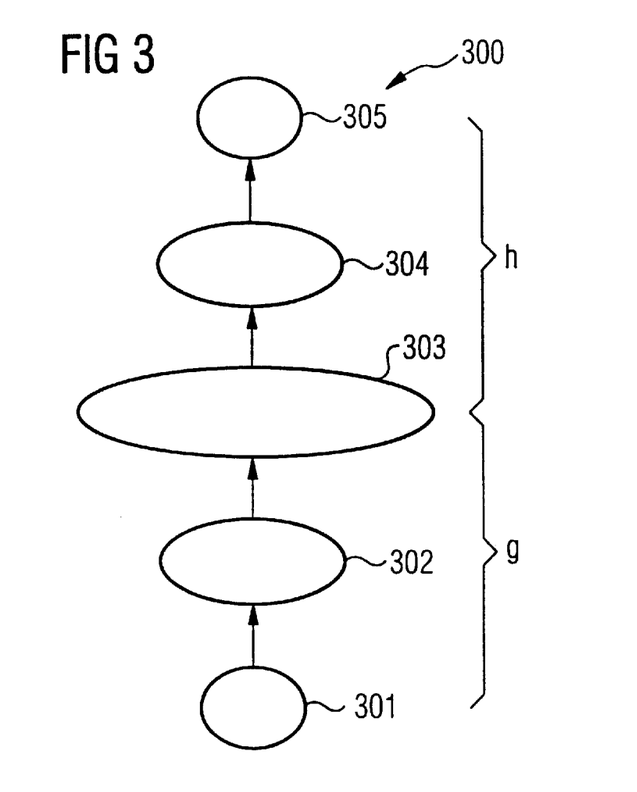
FIG. 3 is a diagram of an auto-associator of the prior art.

The publication by Ackley et al., A Learning Algorithm for Boltzmann Machines discloses what is known as a neural auto-associator (see FIG. 3).

The auto-associator 300 is composed of an input layer 301, of three covered layers 302, 303, 304 as well as of an output layer 305.

The input layer 301 as well as a first covered layer 302 and a second covered layer 303 form a unit with which a first non-linear coordinate transformation g can be implemented.

The second cover layer 303 together with a third covered layer 304 and the output layer 305 together form a second unit with which a second non-linear coordinate transformation h can be implemented.

This five-layer neural network 300 disclosed by Ackley et al. comprises the property that an input quantity $x_t$ is transformed onto an internal system status according to the first non-linear coordinate transformation g. Proceeding from the second covered layer 303, upon employment of the third covered layer 304 toward the output layer 305 upon employment of the second non-linear coordinate transformation h, the internal system status is essentially transformed back onto the input quantity $x_t$. The goal of this known structure is the imaging of the input quantity $x_t$ in a first status space X onto the internal status $s_t$ in a second status space S, whereby the dimension of the second status space Dim(S) should be smaller than the dimension of the first status space Dim(X) in order to achieve a data compression in the hidden layer of the neural network. The back-transformation into the first status space X corresponds to a decompression in this case.

The publication by H. Rehkugler et al., Neuronale Netze in der Ökonomie, Grundlagen und finanzwirtschaftliche Anwendungen also provides an overview of the fundamentals of neural networks and the possible applications of neural networks in the field of economics.

The known arrangements and methods particular exhibit the disadvantage that an identification or, respectively, modeling of a dynamic system that, in particular, is subject to substantial noise, i.e. whose structure is extremely complex in the time domain, is not possible.

SUMMARY OF THE INVENTION

The present invention is thus based on the problem of providing an arrangement of computer elements connected to one another with which a modeling of a dynamic system that is subject to noise is possible, the arrangement not being subject to the disadvantages of the known arrangements.

The invention is also based on the problem of providing a method for computer-supported determination of a dynamics that forms the basis of a dynamic process for dynamic processes that can be determined only within adequate precision with known methods.

The problems are solved by the arrangement as well as by the methods INSERT CLAIMS 2–26

The arrangement of computer elements connected to one another comprises the following features:

a) input computer elements to which time row values that respectively describe a status of a system at a point in time can be supplied;

b) transformation computer elements for the transformation of the time row values into a predetermined space, the transformation elements being connected to the input computer elements;

c) whereby the transformation computer elements are connected such to one another that transformed signals can be taken at the transformation computer elements, whereby at least three transformed signals relate to respectively successive points in time;

d) composite computer elements that are connected to respectively two transformation computer elements;

e) a first output computer element that is connected to the transformation computer elements, whereby an output signal can be taken at the first output computer element; and f) a second output computer element that is connected to the composite computer elements and with whose employment a predetermined condition can be taken into consideration in a training of the arrangement.

A method for the computer-supported determination of a dynamics on which a dynamic process is based comprises the following steps:

a) the dynamic process is described by a time row with time row values in a first status space, whereby at least one first time row value describes a status of the dynamic process at a first point in time and a second time row value describes a status of the dynamic process at a second point in time;

b) the first time row value is transformed into a second status space;

c) the first time row value in the second status space is subjected to an imaging onto a second time row value in the second status space;

d) the second time row value in the second status space is transformed back into the first status space;

e) the transformation and the imaging ensue such that the dynamic process described by the time row values in the second status space satisfies a predetermined condition;

f) a dynamic of the dynamic process is determined from the time row values in the second status space.

Given a method for computer-supported determination of a dynamic that forms the basis of a dynamic process upon employment of an arrangement of computer elements connected to one another, the input signal is supplied to the arrangement and the arrangement determines a first output signal from which the dynamic is determined. The arrangement thereby comprises the following structure:

a) the dynamic process is described by a time row having time row values in a first status space, whereby at least one first time row value describes a status of the dynamic process at a first point in time and a second time row value describes a status of the dynamic process at a second point in time;

b) the first time row value is transformed into a second status space;

c) the first time row value in the second status space is subjected to an imaging onto a second time row value in the second status space;

d) the second time row value in the second status space is transformed back into the first status space;

e) the transformation and the imaging ensue such that the dynamic process described by the time row values in the second status space meets a predetermined condition;

f) the dynamic of the dynamic process is determined from the time row values in the second status space.

In a method for the computer-supported training of an arrangement of computer elements connected to one another, the arrangement is trained upon employment of predetermined training data taking a condition into consideration, whereby the arrangement comprises the following components:

a) the dynamic process is described by a time row with time row values in a first status space, whereby at least one first time row value describes a status of the dynamic process at a first point in time and a second time row value describes a status of the dynamic process at a second point in time;

b) the first time row value is transformed into a second status space;

c) the first time row value in the second status space is subjected to an imaging onto a second time row value in the second status space;

d) the second time row value in the second status space is transformed back into the first status space;

e) the transformation and the imaging ensue such that the dynamic process described by the time row values in the second status space meets a predetermined condition;

f) the dynamic of the dynamic process is determined from the time row values in the second status space.

The invention makes the modeling of a dynamic system that comprises a dynamic process possible on the basis of a smoother trajectory in a new status space, so that the further development thereof can be predicted more simply at a following point in time.

In particular, the invention achieves a better capability of distinguishing between noise and actual dynamic of the dynamic process.

In contrast to the principle of the auto-associator, a dimension reduction in the transformation into the second status space is not a criterion. On the contrary, the dimension of the second status space Dim(S) is usually greater than the dimension of the first status space Dim(X).

Preferred developments of the invention INSERT CLAIMS 2–26.

In one preferred development, the transformation computer elements are grouped in a first hidden layer and a second hidden layer, whereby at least a part of the transformation computer elements of the first hidden layer and of the transformation computer elements of the second hidden layer are connected to one another.

At least a part of the computer elements are preferably artificial neurons.

The transformation computer elements can be connected to one another such that transformed signals can be taken at the transformation computer elements, whereby at least four transformed signals respectively relate to successive points in time.

In general, an arbitrary plurality of successive points in time can be affected by the transformed signals.

It is provided in a further development that the input computer elements are allocated to an input layer, such that the input layer comprises a plurality of sub-input layers, whereby each sub-input layer can be supplied with at least one input signal that describes a system status at respectively one point in time.

The transformation computer elements of the first hidden layer can be grouped in hidden sub-layers such that the transformation computer elements of each hidden sub-layer are respectively connected to input computer elements of a respective sub-input layer.

The connections between the computer elements can be fashioned variably and weighted.

The connections between the composite computer elements and the second output computer elements are invariant.

In a preferred embodiment, at least parts of the connections exhibit the same weighting values.

The condition can be a predetermined smoothness of the dynamic process in the space or can be a Lyapunov zero condition.

The dynamic process can be a dynamic process in a reactor, particularly in a chemical reactor, or can also be a dynamic process for modeling a traffic system; in general, any dynamic process that sequences in a technical dynamic system. Further, the arrangement or, respectively, the method can be utilized within the framework of a modeling of a financial market. In general, the methods and the arrangements are very well-suited for predicting macroeconomic dynamics.

The time row values can be determined from physical signals.

BRIEF DESCRIPTION OF THE DRAWINGS

Exemplary embodiments of the invention are shown in the figures and are explained in greater detail below.

FIG. 10 a sketch of a traffic routing system that is modeled with the arrangement within the scope of a second exemplary embodiment.

FIRST EXEMPLARY EMBODIMENT

Chemical Reactor

Figure 4:
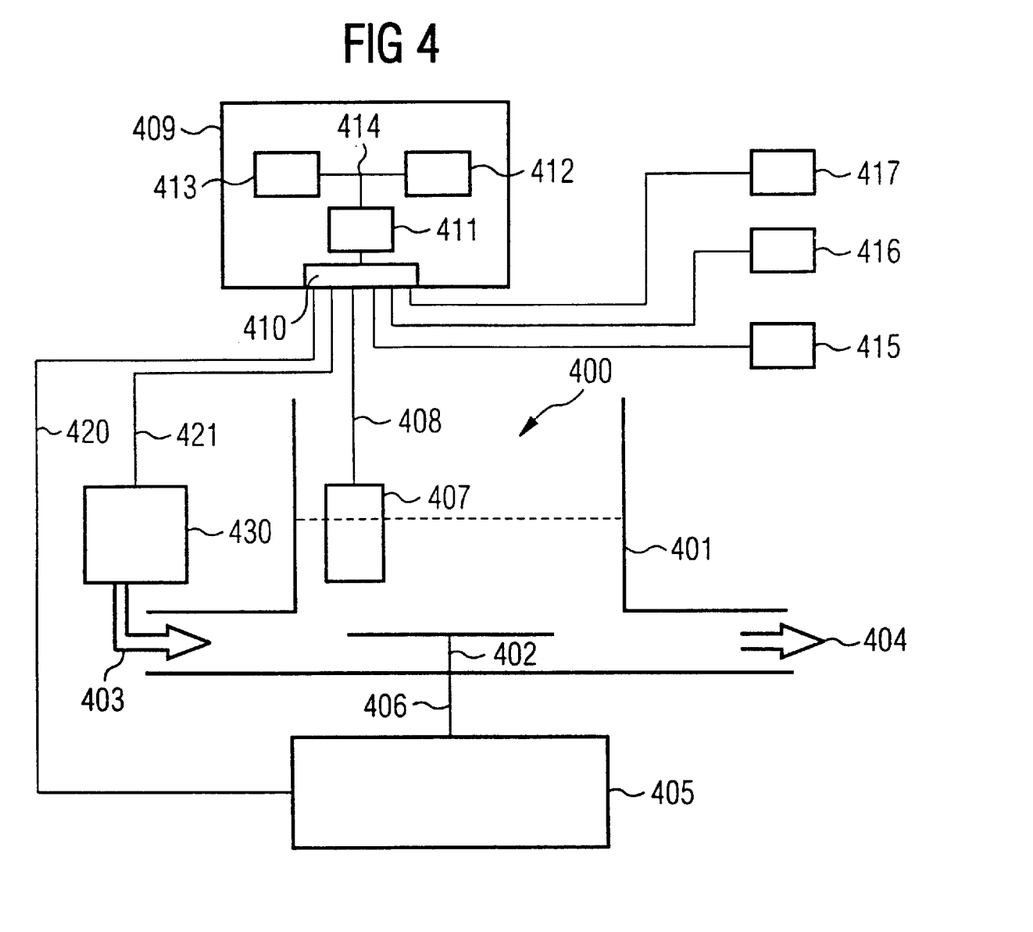
FIG. 4 is a functional block diagram of a chemical reactor at which quantities are measured that are further-processed with the arrangement.

FIG. 4 shows a chemical reactor 400 that is filled with a chemical substance 401. The chemical reactor 400 comprises an agitator 402 with which the chemical substance 401 is stirred. Further chemical substances 403 entering into the chemical reactor 400 react with the chemical substance 401 already contained in the chemical reactor 400 during a prescribable time span in the chemical reactor 400. A substance 404 flowing out of the reactor 400 is diverted from the chemical reactor 400 via an output.

The agitator 402 is connected via a line to a control unit 405 with which a stirring frequency of the agitator 402 can be set via a control signal 406.

Further, a measuring instrument 407 is provided with which concentrations of chemical substances contained in the chemical substance 401 are measured.

Measured signals 408 are supplied to a computer 409, are digitalized in the computer 409 via an input/output interface 410 and an analog-to-digital converter 411 and are stored in a memory 412. A processor 413, just like the memory 412, is connected to the analog-to-digital converter 411 via a bus 414. The computer 409 is also connected via the input/output interface 410 to the controller 405 of the agitator 402; the computer 409 thus controls the stirring frequency of the agitator 402.

The computer 409 is also connected via the input/output interface 410 to a keyboard 415, to a computer mouse 416 as well as to a picture screen 417.

The chemical reactor 400, as a dynamic technical system 200, is thus subject to a dynamic process.

The chemical reactor 400 is described with a status description. The input quantity $u_t$ in this case is composed of a particular about the temperature, i.e. the quality $u_t$ is the temperature, that prevails in the chemical reactor 400 as well as the pressure prevailing in the chemical reactor 400 and the stirring frequency set at the point in time t. The input quantity is thus a three-dimensional vector.

The goal of the modeling of the chemical reactor 400 described below is the determination of the dynamic development of the material concentrations in order to thus enable an efficient production of a prescribable target substance to be produced as the discharged substance 404.

This ensues upon employment of the arrangement described below in FIG. 1a and FIG. 1b.

Figure 5:
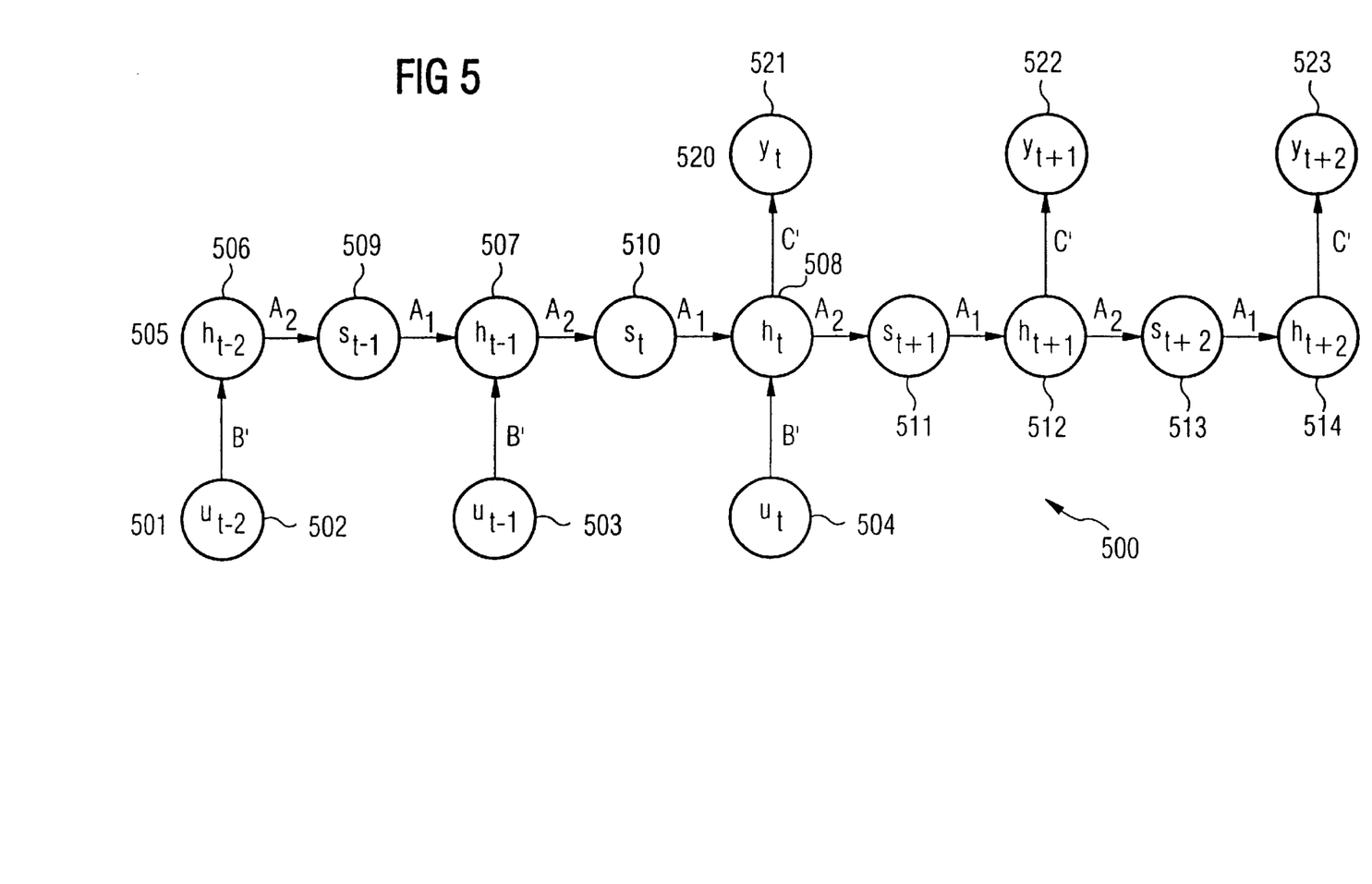
FIG. 5 is a flow diagram of an arrangement of a TDRNN that is developed with a finite plurality of statuses over the time.

For a simpler understanding of the principles underlying the arrangement, FIG. 5 shows the known TDRNN as a neural network 500 developed over a finite plurality of points in time.

The neural network 500 shown in FIG. 5 comprises an input layer 501 having three sub-input layers 502, 503 and 504 that respectively contain a prescribable plurality of input computer elements to which input quantities $u_t$ can be applied at a prescribable point in time t, i.e. in time row values described below.

Input computer elements, i.e. input neurons, are connected to a neurons of a prescribable plurality of hidden layers 505 via variable connections.

Neurons of a first hidden layer 506 are thereby connected to neurons of the first sub-input layer 502. Further, neurons of a second hidden layer 507 are connected to neurons of the second input layer 503. Neurons of a third hidden layer 508 are connected to neurons of the third sub-input layer 504.

The connections between the first sub-input layer 502 and the first hidden layer 506, between the second sub-input layer 503 and the second hidden layer 507 as well as between the third sub-input layer 504 and the third hidden layer 508 are respectively the same. The weightings of all connections are respectively contained in a first connection matrix B'.

Neurons of a fourth hidden layer 509 have their inputs connected to outputs of neurons of the first hidden layer 502 according to a structure established by a second connection matrix $A_2$. Further, outputs of the neurons of the first hidden layer 509 are connected to inputs of neurons of the second hidden layer 507 according to a structure established by a third connection matrix $A_1$.

Further, neurons of a fifth hidden layer 510 have their inputs connected to outputs of neurons of the second hidden layer 507 according to a structure established by the third connection matrix $A_2$. Outputs of the neurons of the fifth hidden layer 510 are connected to inputs of neurons of the third hidden layer 508 according to a structure established by the third connection matrix $A_1$.

This type of connection structure applies an equivalent fashion for a sixth hidden layer 511 that is connected to outputs of the neurons of the third hidden layer 508 according to a structure established by the second connection matrix $A_2$ and to neurons of a seventh hidden layer 512 according to a structure established by the third connection matrix $A_1$.

Neurons of an eighth hidden layer 513 are in turn connected to neurons of the seventh hidden layer 512 according to a structure established by the first connection matrix $A_2$ and are connected to neurons of a ninth hidden layer 514 via connections according to the third connection matrix $A_1$. The particulars in the indices in the respective layers respectively indicate the point in time t, t−1, t−2, t+1, t+2 to which the signals that can be respectively taken or, respectively, supplied to the outputs of the respective layer refer ($u_t$, $u_{t+1}$, $u_{t+2}$).

An output layer 520 comprises three sub-output layers, a first sub-output layer 521, a second sub-output layer 522 as well as a third sub-output layer 523.

Neurons of the first sub-output layer 521 are connected to neurons of the third hidden layer 508 according to a structure established by an output connection matrix C'.

Neurons of the second sub-output layer are likewise connected to neurons of the eighth hidden layer 512 according to the structure established by the output connection matrix C'. Neurons of the third sub-output layer 523 are connected to neurons of the ninth hidden layer 514 according to the output connection matrix C'.

The output quantities for a respective point in time t, t+1, t+2 can be taken at the neurons of the sub-output layers 521, 522 and 523 ($y_t$, $y_{t+1}$, $y_{t+2}$).

Figure 1A:
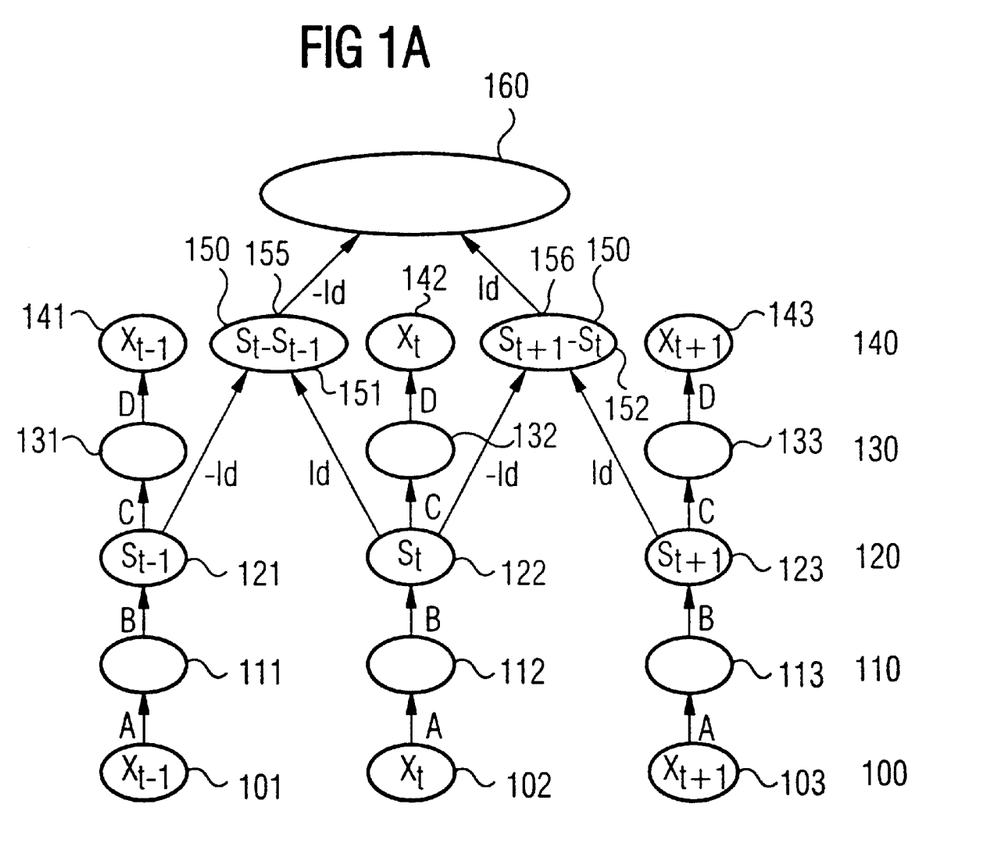
FIGS. 1a and 1b as diagrams of the arrangement according to an exemplary embodiment.

Proceeding on this principle of what are referred to as shared weights, i.e. the principle that equivalent connection matrices in a neural network exhibit the same values at a respective point in time, the arrangement shown in FIG. 1a is explained below.

The sketches described below are to be respectively understood such that each layer or, respectively, sub-layer comprises a prescribable plurality of neurons, i.e. computer elements.

The respective connection matrices are an arbitrary dimension and respectively contain the weight values for the corresponding connections between the neurons of the respective layers.

The arrangement shown in FIG. 1a comprises an input layer 100 having three sub-input layers 101, 102 and 103, whereby each sub-input layer 101, 102, 103 can be respectively supplied with time row values $x_{t-1}$, $x_t$, $x_{t+1}$ at a respective point in time t−1, t or, respectively, t+1. The sub-input layers 101, 102, 103 of the input layer 101 are respectively connected via connections according to a fourth connection matrix A to neurons of a first hidden layer 110 having respectively three sub-layers 111, 112 and 113 of the first hidden layer 110.

The neurons of the sub-layers 111, 112 and 113 of the first hidden layer 110 are connected to neurons of a second hidden layer 120 that is in turn three sub-layers of the second hidden layer 120, which are a first sub-layer 121, a second sub-layer 122 as well as a third sub-layer 123 with connections according to a fifth connection matrix B.

Neurons of a third hidden layer 130 that itself in turn comprises three sub-layers 131, 132 and 133 are connected to the second hidden layer 120 according to a structure established by a sixth connection matrix C.

The neurons of the third hidden layer 130 are connected according to a structure established by a seventh connection matrix D to neurons of a first output layer 140 that itself in turn comprises three sub-layers 141, 142 and 143.

Further, a second output layer 150 having a first sub-output layer 151 and a second sub-output layer 152 of the second output layer 150 is provided.

A first sub-output layer 151 of the second output layer 150 is connected to the neurons of the first sub-layer 121 of the second hidden layer 120 as well as of the second sub-layer 122 of the second hidden layer 120.

The second sub-layer 152 of the second output layer 150 is connected, on the one hand, to the second sub-layer 122 and, on the other hand, to the third sub-layer 123 of the second hidden layer 120.

The difference of the "inner" system statuses of two successive points in time t−1, t and t+1 that are represented in the sub-layers 121, 122 and 123 of the second hidden layer 120 of the neural network are respectively formed in the sub-layers of the second output layer 150.

A first different ($s_t - s_{t-1}$) can thus be taken at an output 155 of the first sub-output layer 151 of the second output layer 150, and a second difference ($s_{t+1} - s_t$) can be taken at an output 156 of the second sub-output layer 152.

A third output layer 160 is connected to the two sub-output layers 151, 152 of the second output layer 150.

Upon employment of a cost function F for measuring the curvature of the trajectory to be described to the second status space S, the cost function F being formed according to the following rule:

$$F = \frac{1}{T}\sum_{t=1}^{T}\frac{(s_{t+1}-2s_t+s_{t-1})^2}{(s_{t+1}-s_t)^2+(s_t-s_{t-1})^2}, \quad (5)$$

an overall cost function E' is formed, upon employment whereof the neural network is trained with a training data set that is acquired by measuring quantities in the chemical reactor 400, whereby the overall cost function E' is formed according to the following rule:

$$E' = \frac{1}{T}\sum_{t=1}^{T}(y_t - y_t^d)^2 + \frac{(s_{t+1}-2s_t+s_{t-1})^2}{(s_{t+1}-s_t)^2+(s_t-s_{t-1})^2} \longrightarrow \min_{f,g}. \quad (6)$$

The back-propagation method is utilized as a training method. The training data set is acquired from the chemical reactor 400 in the following way.

Concentrations are measured with the measuring instrument 407 for predetermined input quantities and are supplied to the computer 409, are digitalized thereat and, as time row values $x_t$, are grouped in a memory in common with the corresponding input quantities that correspond with the measured quantities.

In order to also be able to take the time flow of the system statuses $s_t$ into consideration in the "inner" system status, two further hidden layers 170, 171 (see FIG. 1b) are provided, whereby a first further layer 170 is connected to neurons of the first sub-layer 121 of the second hidden layer 120 according to a structure established by an eighth connection matrix E.

Outputs of the neurons of the first further layer 170 are connected to inputs of neurons of the second sub-layer 122 of the second hidden layer 120 according to a structure that is prescribed by a ninth connection matrix F.

The second further layer 171 has its inputs connected to outputs of the neurons of the second sub-layer 122 of the second hidden layer 120 according to a structure that is established by the eighth connection matrix E.

Outputs of neurons of the second further layer 171 are connected according to the ninth connection matrix F to inputs of neurons of the third sub-layer 122 of the second hidden layer 120. The further elements in FIG. 1b are, given the same designations, connected to one another in a way corresponding to the components of FIG. 1a.

Figure 1B:
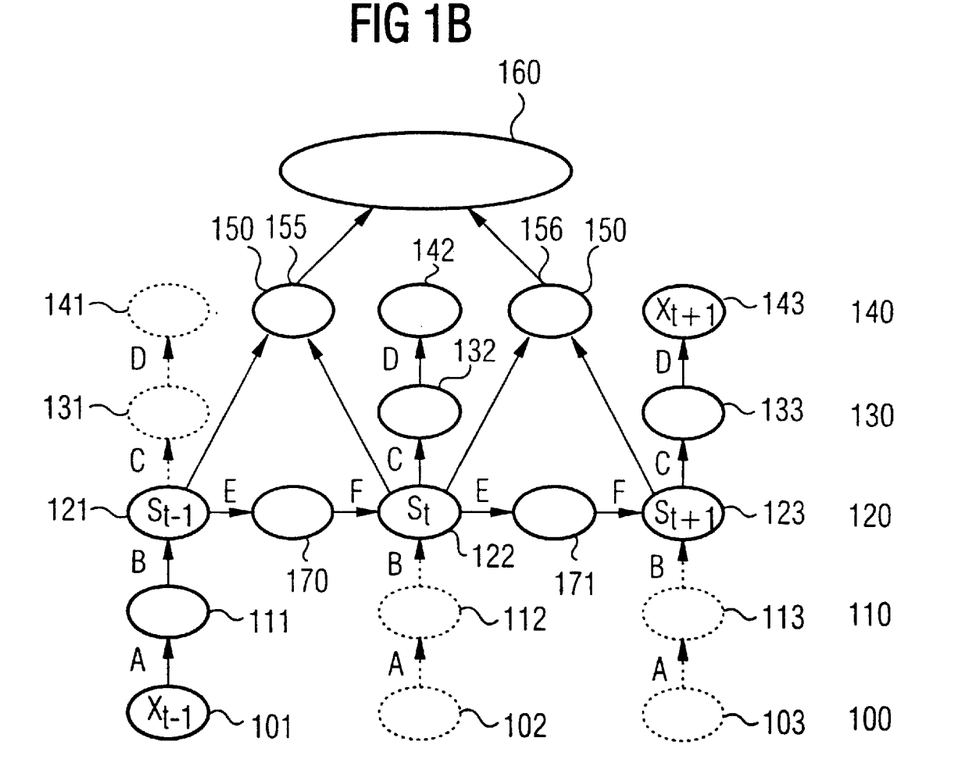

Elements shown with broken lines in FIG. 1b are not required in the arrangement of FIG. 1b for the training upon employment of the training data set and the overall cost function E'.

The arrangement from FIG. 1b is trained upon employment of the training data set and of the overall cost function.

Figure 6:
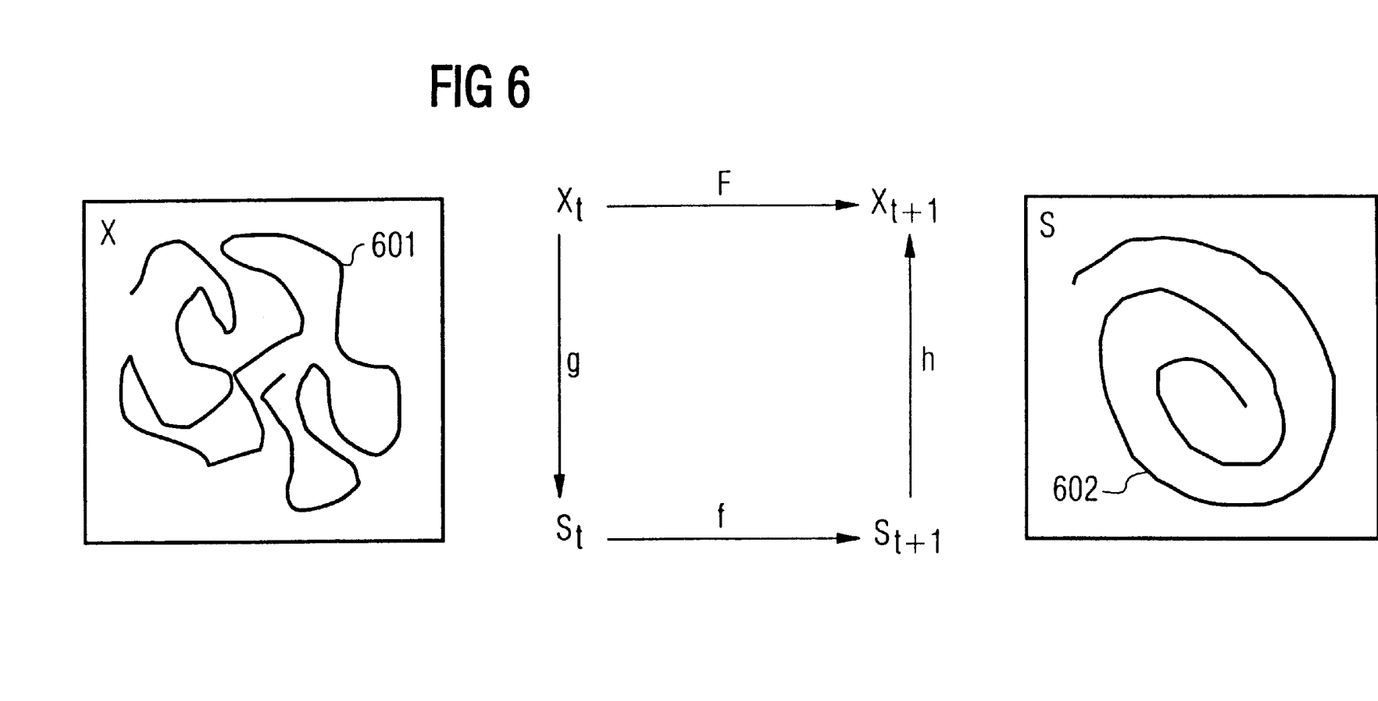
FIG. 6 is a series of diagrams by which a spatial transformation is explained.

For better illustration of the transformation achieved by the arrangement, FIG. 6a shows a time curve 601 of the dynamic process in a first space X.

Time row values $x_t$ in the first space X are transformed upon employment of the first imaging function g(.) into a second status space S such that the curve of the dynamic process in the second space S meets a predetermined condition better than the curve of the dynamic process in the first space X.

The condition predetermined in the exemplary embodiment is a maximally optimized smoothness of a trajectory. This clearly means that an imaging in the first space X of a time row value $x_t$ at a first point in time t onto a time row $x_{t+1}$ of a following point in time t+1 is clearly subject to high noise and exhibits only a slight structure.

An image f of a value $s_t$ in the second space S at a point in time t onto a value $s_{t+1}$ at a following point in time t+1 should exhibit less noise and an optimally great structure.

The imaged quantity $s_{t+1}$ in the second space S is transformed back to the time row value $x_{t+1}$ of the point in time t+1 following in time upon employment of a back transformation according to the second imaging function h(.).

This clearly means that the imaging with high noise and little structure F is divided into a plurality of images according to the following rule:

$$x_{t+1} = h \circ f \circ g(x_t). \quad (7)$$

The determination of the dynamics can now be formulated in two phases.

1. An imaging rule g: X→S is sought with which the first space X is imaged into a second space S such that the dynamic of the process in the second space S, described by the trajectory 602, has a smoother curve than the trajectory in the first space X.

2. A back-transformation rule h: S→X from the second space S into the first space X is sought, such that the following is valid:

$$\|x_t - h \circ g(x_t)\| \longrightarrow \min_{g,h}, \quad (8)$$

whereby $s_t$, t=1, . . . , T meets an additional condition, for instance smoothness.

After the corresponding transformation has been learned upon employment of the above-described arrangement in the form of connection matrices, the dynamic imaging f is determined in the second space S such that the following is valid:

$$f: S \to S, \quad (9)$$

$$\|x_{t+1} - h \circ f \circ g(x_t)\| \longrightarrow \min_f. \quad (10)$$

The arrangement from FIG. 1b trained according to the above-described training method is utilized such for the determination of chemical quantities in the chemical reactor 400 that prognosis quantities $x_{t+1}$ and $x_t$ for an input quantity at a point in time t-1 are determined by the arrangement in an application phase, these prognosis quantities being subsequently employed as control quantities, following a potential editing of the identified quantities, as control quantities 420 and 421 [ . . . ] the control means 405 for controlling the agitator 402 or, too, an influx control means 430 for controlling the influx of further chemical substances 403 in the chemical reactor 400 (see FIG. 4).

Figure 7A:
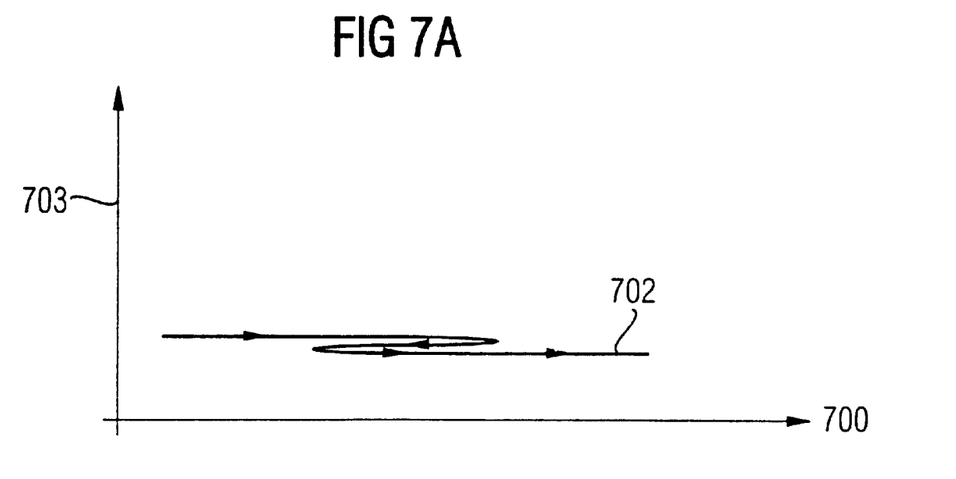
FIGS. 7a and b are graphs which draw a course of a dynamic process in a status space with noise (FIG. 7a) and without noise (FIG. 7b)

The arrangement and the training of the arrangement also achieve that a trajectory 702 determined in a status space 701, this trajectory being subject to noise, is not suitable in a standard method and a scaling 703 resulting therefrom for usable determination of a dynamic underlying the process (see FIG. 7a).

Figure 7B:
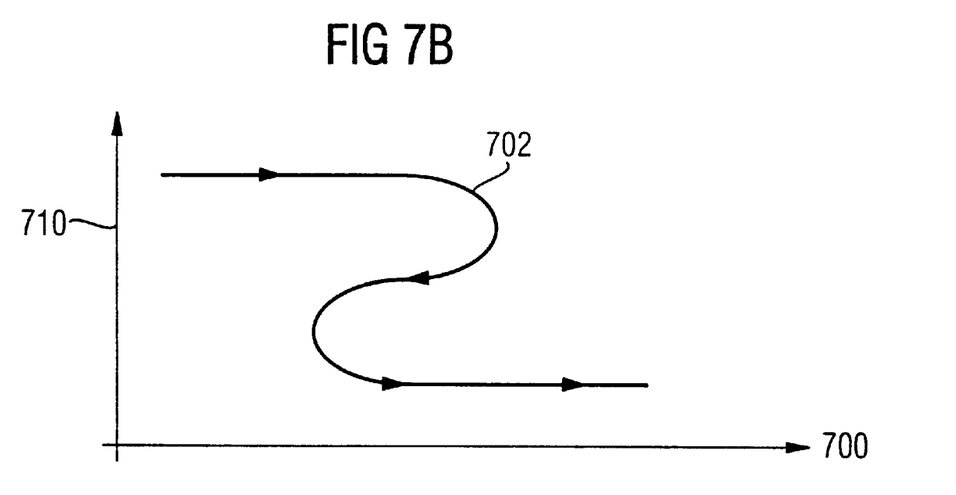

As a result of the possibility of taking the smoothness condition into consideration in a further, the second space, a dynamic along a modified scaling 710 is now achieved in the status space 700 such that the curve of the trajectory 702 exhibits greater smoothness and, thus, noise no longer impedes the determination of the dynamic to that extent (see FIG. 7b).

2. Exemplary Embodiment

Further Influencing Quantities

Figure 8:
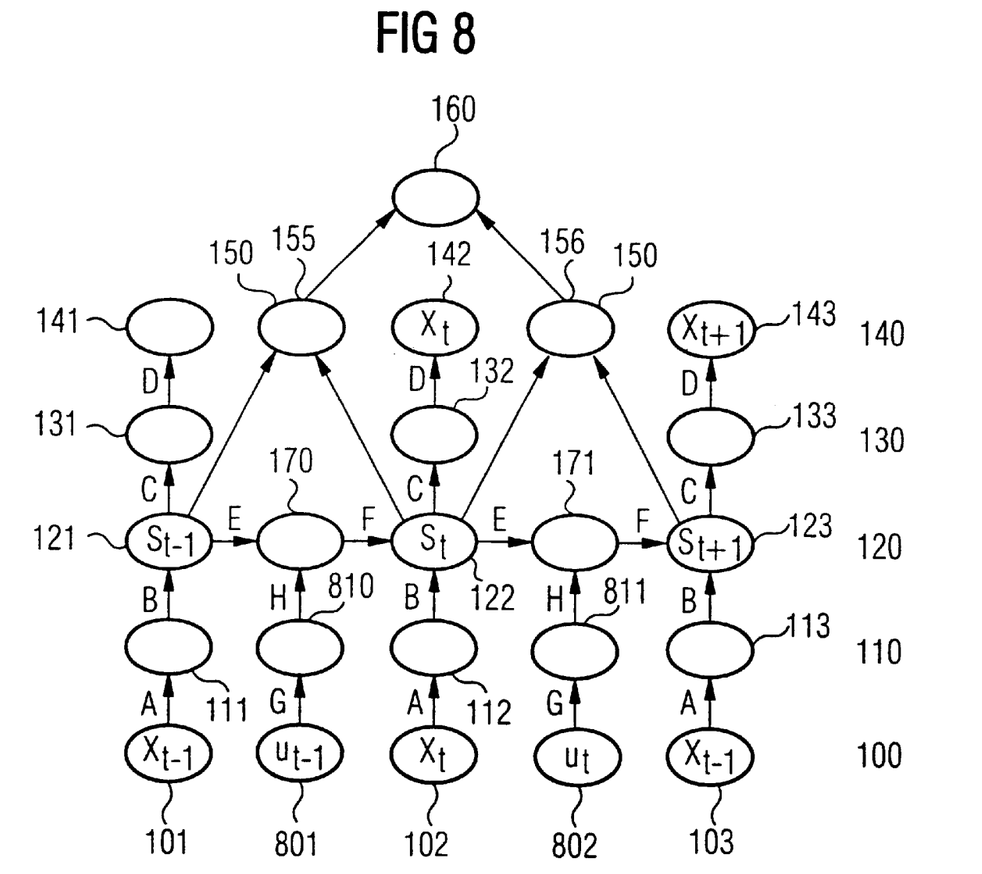
FIG. 8 is a flow diagram of an arrangement according to an exemplary embodiment to which further external input quantities can be supplied.

Further external influencing quantities can be taken into consideration via the arrangement shown in FIG. 8. When configured the same, components from FIG. 1a and FIG. 1b are provided with the same reference characters. Additionally, the arrangement comprises a first external input layer 801 and a second external input layer 802 to whose neurons further external quantities can be supplied at a point in time t−1 ($u_{t-1}$) or, respectively, to which external quantities $u_t$ can be supplied at a second point in time t. According to the above-described principle of shared weights, neurons of the first external layer 801 and of the second external layer 802 are respectively connected to a first pre-processing layer 810 and to a second pre-processing layer 811 via a structure according to a tenth connection matrix G.

The neurons of the first pre-processing layer 810 or, respectively, of the second pre-processing layer 811 are respectively connected to inputs of the first further layer 170 or, respectively, of the second further layer 171 according to a structure established by an eleventh connection matrix H.

The eleventh connection matrix H thereby represents a diagonal matrix.

3. Exemplary Embodiment

Dynamic Traffic Modeling and Traffic Jam Prediction

Figure 9:
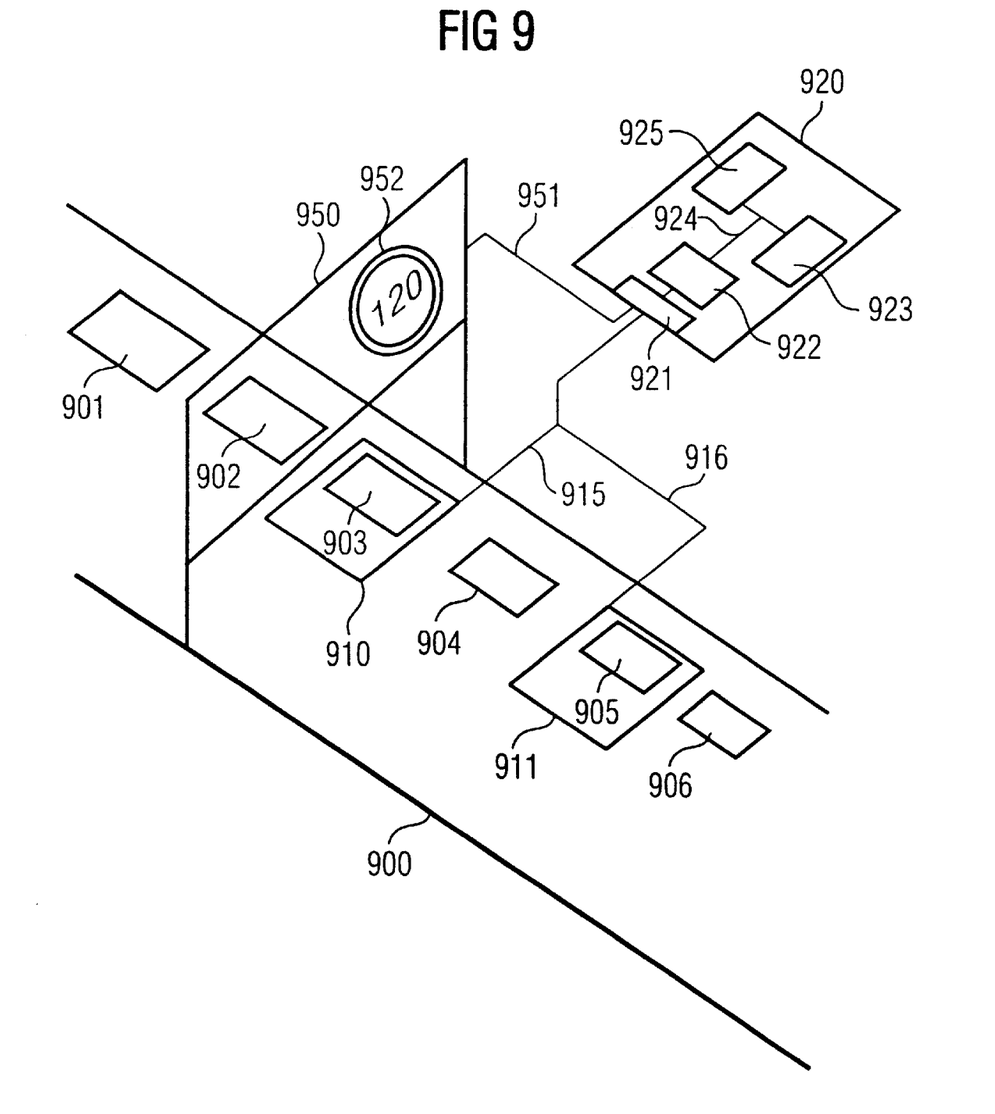
FIG. 9 is a diagram of a spatial transformation with reference to which an exemplary embodiment is explained in greater detail.

FIG. 9 shows a street 900 on which automobiles 901, 902, 903, 904, 905 and 906 travel.

Conductor loops 910, 911 integrated in the street 900 register electrical signals in a known way and conduct the electrical signals 915, 916 to a computer 920 via an input/output interface 921. The electrical signals are digitalized into a time row in an analog-to-digital converter 922 connected to the input/output interface 921 and are stored in a memory 923 that is connected via a bus 924 to the analog-to-digital converter 922 and to a processor 925. Control signals 951 are supplied via the input/output interface 921 to a traffic routing system 950, a predetermined speed limit 952 (shown here in km/hr.) being capable of being set therefrom in the traffic routing system 950, or other indications of a traffic rules that are presented to drivers of the vehicles 901, 902, 903, 904, 905 and 906 via the traffic routing system 950.

The following, local status quantities are employed in this case for traffic modeling:

traffic flow velocity v, vehicle density ρ

$$\left(\rho = \text{plurality of vehicles per kilometer } \frac{Fz}{\text{km}}\right),$$

traffic flow q $$\left(q = \text{plurality of vehicles per hour } \frac{Fz}{\text{h}}, \ (q = v * \rho)\right);$$

and speed limits 952 respectively indicated at a point in time by the traffic routing system 950.

As described above, the local status quantities are measured upon employment of the conductor loops 910, 911.

These quantities (v(t), ρ(t), q(t)) thus represent a status of the technical system "traffic" at a specific point in time t. An evaluation r(t) of a respectively current status ensues from these quantities, for example with respect to traffic flow and homogeneity. This evaluation can ensue quantitatively or qualitatively.

The traffic dynamic is modeled in two phases within the scope of this exemplary embodiment:

1. A transformation g of the observed status description x(t):=(v(t), ρ(t), q(t)) into a second space S is defined such that a dynamic s(t) in the second space S meets a predetermined condition, for example that of smoothness, better than in the first space X. This ensues in a way corresponding to that for the chemical reactor in the first exemplary embodiment.

Control signals 951 are formed from predictive quantities determined in the application phase, these control signals 951 indicating what speed limit should be selected for a future time span (t+1).

Some alternatives of the above-described exemplary embodiment are presented below.

Alternatively, the following cost functions can also be selected as overall cost function E':

$$E' = \frac{1}{T}\sum_{t=1}^{T}(y_t - y_t^d)^2 + \frac{\|s_{t+1} - s_t\| + \|s_t - s_{t-1}\|}{\|(s_{t+1} - s_t) + (s_t - s_{t-1})\|} \longrightarrow \min_{f,g}, \quad (11)$$

$$E' = \frac{1}{T}\sum_{t=1}^{T}(y_t - y_t^d)^2 + \frac{(s_{t+1} - s_t) \cdot (s_t - s_{t-1})}{\|s_{t+1} - s_t\| \cdot \|s_t - s_{t-1}\|} \longrightarrow \min_{f,g}. \quad (12)$$

Further, the condition is not limited to a smoothness condition.

A Lyapunov zero condition can also be utilized. Correspondingly, the overall cost function E' as well as the cost function F are modified in this case, as explained below.

Proceeding from the Lyapunov exponent L, which is formed according to the following rule:

$$L = \frac{1}{T}\sum_{t=1}^{T}\ln\|s_{t+1} - s_t\| - \ln\|s_t - s_{t-1}\|, \quad (13)$$

the cost function F derives according to the following rule:

$$F = \frac{1}{T}\sum_{t=1}^{T}(\ln\|s_{t+1} - s_t\| - \ln\|s_t - s_{t-1}\|)^2 \longrightarrow \min. \quad (14)$$

the overall cost function E" taking the Lyapunov zero condition into consideration derives according to the following rule in this case:

$$E'' = E' + \frac{1}{T}\sum_{t=1}^{T}(\ln\|s_{t+1} - s_t\| - \ln\|s_t - s_{t-1}\|)^2 \longrightarrow \min. \quad (15)$$

A largely constant velocity in the process modeling is achieved by taking the Lyapunov zero condition into consideration. This means that the velocity of the process is kept largely constant overall when the dynamic process comprises a plurality of dynamic sub-processes with different time constants, i.e. that the sub-processes sequence at different speeds. In a chemical process, sub-processes frequently occur with substantially different reaction speeds.

By taking the Lyapunov zero condition into consideration, the space transformation g, h is designed such that the time for the sub-processes sequencing faster is "stretched" and the time for the sub-processes sequencing slower is "compressed" for that case wherein an observable dynamic of the input quantities $x_t$ comprises different time scales.

In this way, it is now possible to check the modeled dynamic system 200 for a property, namely as to whether the dynamic system is a matter of an emerging system.

What is achieved by taking the Lyapunov zero condition into consideration is that the arrangement can be trained with a lower plurality of training data, since the arrangement is already reduced into a specific sub-space, the sub-space of an emergent system. The training phase is thus speeded up or, respectively, the calculating outlay for training the arrangement is considerably diminished.

This fact can be advantageously utilized in the prediction of macro-economic dynamics since a macro-economic system is a matter of an emergent system.

A possible realization of the above-described exemplary embodiment is recited below for the program SENN, Version 2.3. The realization comprises three sections that each respectively contain a program code that are required for processing in SENN, Version 2.3.

We claim:

1. An arrangement of computer elements connected to one another, comprising:
   a) input computer elements to which time row values that respectively describe a status of a system at a point in time are supplied;
   b) transformation computer elements for transformation of the time row values into a predetermined space, said transformation computer elements being connected to the input computer elements;
   c) connections between the transformation computer elements such that transformed signals are taken at the transformation computer elements, at least three of the transformed signals relate to respectively successive points in time;
   d) composite computer elements that are respectively connected to two of said transformation computer elements;
   e) a first output computer element that is connected to the transformation computer elements, an output signal being taken at the first output computer element; and
   f) a second output computer element that is connected to the composite computer elements and with whose employment a predetermined condition in the prescribed space is taken into consideration in a training of the arrangement.

2. An arrangement according to claim 1, wherein the transformation computer elements are grouped into a first hidden layer and into a second hidden layer, whereby at least a part of the transformation computer elements of the first hidden layer and of the transformation computer elements of the second hidden layer are connected to one another.

3. An arrangement according to claim 2, wherein the input computer elements are allocated to an input layer that includes sub-input layers, and the transformation computer elements of the first hidden layer are grouped into hidden sub-layers such that the transformation computer elements of each of said hidden sub-layers are respectively connected to input computer elements of respective ones of said sub-input layers.

4. An arrangement according to claim 1, wherein at least a part of the computer elements are artificial neurons.

5. An arrangement according to claim 1, wherein the transformation computer elements are connected to one another such that transformed signals is taken at the transformation computer elements, at least four transformed signals relating to respectively successive points in time.

6. An arrangement according to claim 1, wherein the input computer elements are allocated to an input layer such that the input layer includes a plurality of sub-input layers, each of said sub-input layers supplied with at least one input signal that describes a system status at a respective point in time.

7. An arrangement according to claim 1, wherein at least a part of the connections between the computer elements are variably fashioned.

8. An arrangement according to claim 1, wherein the connections between the composite computer elements and the second output computer element are invariant.

9. An arrangement according to claim 1, wherein at least parts of the connections exhibit mutually same weightings.

10. An arrangement according to claim 1, wherein said arrangement is configured such that the predetermined condition is a predetermined smoothness of a dynamic process in space.

11. An arrangement according to claim 1, wherein said arrangement is configured such that the predetermined condition is a Lyapunov zero condition.

12. An arrangement according to claim 1, wherein said arrangement is utilized for determining a dynamic of a dynamic process.

13. An arrangement according to claim 12, further comprising: a measuring arrangement for acquiring physical signals with which the dynamic process is described.

14. An arrangement according to claim 12, wherein said arrangement utilized for determining the dynamic of a dynamic process in a reactor.

15. An arrangement according to claim 12, wherein said arrangement is utilized for determining the dynamic of a dynamic process in a chemical reactor.

16. An arrangement according to claim 12, wherein said arrangement is utilized for determining the dynamic of a dynamic process for traffic modeling.

17. An method for computer-supported determination of a dynamic that forms a basis of a dynamic process, comprising the following steps:
   a) describing the dynamic process by a time row having time row values in a first status space, at least one first time row value describing a status of the dynamic process at a first point in time and a second time row value describing a status of the dynamic process at a second point in time;
   b) transforming the first time row value into a second status space;
   c) subjecting the first time row value in the second status space to an imaging onto a second time row value in the second status space;
   d) transforming the second time row value in the second status space back into the first status space;
   e) performing the transformation and the imaging such that the dynamic process described by the time row values in the second status space meets a predetermined condition in the second status space; and
   f) determining the dynamic of the dynamic processes from the time row values in the second status space.

18. A method according to claim 17, wherein the time row values are vectors of a prescribable dimension.

19. A method according to claim 17, further the time row values are determined from physical signals.

20. A method according to claim 19, wherein the time row values describe a dynamic process in a reactor.

21. A method according to claim 20, wherein the time row values describe a dynamic process in a chemical reactor.

22. A method according to claim 19, wherein the time row values describe a dynamic process for traffic modeling.

23. A method according to claim 17, wherein the predetermined condition is predetermined smoothness of the dynamic process in the space.

24. A method according to claim 17, wherein the predetermined condition is a Lyapunov zero condition.

25. A arrangement of computer elements connected to one another for computer-supported determination of a dynamic that forms a basis of a dynamic process, comprising:
- a) input computer elements supplied with an input signal that describes a system status at a point in time;
- b) transformation computer elements for transformation of the input signal into a predetermined space connected to the input computer elements;
- c) connections between the transformation computer elements such that transformed signals are taken at the transformation computer elements, at least three of the transformed signals relating to respectively successive points in time;
- d) composite computer elements connected to respectively two of said transformation computer elements;
- e) a first output computer element connected to the transformation computer elements, said first output computer element producing an output signal that describes a system status at a point in time;
- f) a second output computer element connected to the composite computer elements, a predetermined condition in the prescribed space being taken into consideration in a training of the arrangement upon employment of the second output computer element;
  - wherein the arrangement is supplied with the input signal, and the arrangement determines the first output signal from which the dynamic is determined.

26. A method for computer-supported training of an arrangement of computer elements connected to one another, comprising the steps of:
- a) supplying input computer elements with an input signal that describes a system status at a point in time;
- b) connecting transformation computer elements for transformation of the input signal into a predetermined space to the input computer element;
- c) connecting the transformation computer elements to one another such that transformed signals are taken at the transformation computer elements, at least three of said transformed signals relating to respectively successive points in time;
- d) connecting composite computer elements to respectively two transformation computer elements;
- e) connecting a first output computer element to the transformation computer elements, an output signal that describes a system status at a point in time is taken at the first output computer element;
- f) connecting a second output computer element to the composite computer elements, a predetermined condition in the prescribed space is taken into consideration in a training of the arrangement upon employment of the second output computer element;
  - training the arrangement taking the predetermined condition into consideration and using predetermined training data.

\* \* \* \* \*